United States Patent
Doi et al.

(10) Patent No.: US 12,445,321 B2
(45) Date of Patent: Oct. 14, 2025

(54) COMMUNICATION RELAY DEVICE, COMMUNICATION CONTROL METHOD, AND NON-TRANSITORY COMPUTER READABLE STORAGE MEDIUM

(71) Applicant: YAMAHA CORPORATION, Hamamatsu (JP)

(72) Inventors: Hayato Doi, Hamamatsu (JP); Nobuhiko Uemura, Hamamatsu (JP); Tsuyoshi Takazawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 422 days.

(21) Appl. No.: 17/988,098

(22) Filed: Nov. 16, 2022

(65) Prior Publication Data

US 2023/0188377 A1    Jun. 15, 2023

(30) Foreign Application Priority Data

Dec. 13, 2021   (JP) ................. 2021-201965

(51) Int. Cl.
*H04L 12/28* (2006.01)
(52) U.S. Cl.
CPC ................... *H04L 12/28* (2013.01)
(58) Field of Classification Search
CPC ............... H04L 12/28; H04L 49/70
See application file for complete search history.

(56) References Cited

U.S. PATENT DOCUMENTS

| 5,802,047 A | 9/1998 | Kinoshita |
| 2013/0174150 A1* | 7/2013 | Nakajima ........... G06F 9/45558 718/1 |
| 2014/0241353 A1* | 8/2014 | Zhang .................... H04L 45/74 370/392 |

(Continued)

FOREIGN PATENT DOCUMENTS

| EP | 0910195 A2 | 4/1999 |
| JP | H08331165 A | 12/1996 |
| JP | H11168494 A | 6/1999 |

(Continued)

OTHER PUBLICATIONS

Notice of Reasons for Refusal issued in Japanese Appln. No. 2021-201965 mailed Jun. 17, 2025. English machine translation provided.

*Primary Examiner* — Shawn D Miller
(74) *Attorney, Agent, or Firm* — ROSSI, KIMMS & McDOWELL LLP

(57) ABSTRACT

A communication relay device includes a plurality of LAN ports configured to connect to at least one communication terminal; a first communication unit configured to receive first information transmitted from the at least one communication terminal via the plurality of LAN ports; a processor; and a memory configured to store a program, the program being executed by the processor to cause the processor to: set a LAN (Local Area Network) interface among a plurality of LAN interfaces for each of the plurality of LAN ports; set a MAC address from a plurality of MAC addresses for each of the plurality of LAN interfaces; and control communication so that each of the plurality of LAN interfaces functions as a virtual single switch associated with the MAC address.

20 Claims, 13 Drawing Sheets

(56) References Cited

U.S. PATENT DOCUMENTS

2014/0355480 A1\* 12/2014 Matsunaga ......... H04L 12/4641
370/254
2016/0036643 A1\* 2/2016 Nair ....................... H04L 49/35
370/255

FOREIGN PATENT DOCUMENTS

| JP | 2019205115 A | 11/2019 |
| JP | 2021111857 A | 8/2021 |
| WO | 2008114424 A1 | 9/2008 |

\* cited by examiner

| LAN interface | LAN port |
|---|---|
| LAN1 | 1,2,3,4 |
| LAN2 | 5,6,7,8 |
| LAN3 | 9 |
| LAN4 | 10 |

| LAN interface | LAN port | MAC address |
|---|---|---|
| LAN1 | 1,2,3,4 | 00:00:00:00:00:01 |
| LAN2 | 5,6,7,8 | 00:00:00:00:00:02 |
| LAN3 | 9 | 00:00:00:00:00:03 |
| LAN4 | 10 | 00:00:00:00:00:04 |

| LAN port | LAN interface identification information |
|---|---|
| 1,2,3,4 | ID1 |
| 5,6,7,8 | ID2 |
| 9 | ID3 |
| 10 | ID4 |

Please input each item. After completing the input, please press "Confirm"

| Setting of LAN interface | | | | |
|---|---|---|---|---|
| LAN port 1 | LAN port 3 | LAN port 5 | LAN port 7 | LAN port 9 |
| LAN1 ▽ | LAN1 ▽ | LAN2 ▽ | LAN2 ▽ | LAN3 ▽ |
| LAN port 2 | LAN port 4 | LAN port 6 | LAN port 8 | LAN port 10 |
| LAN1 ▽ | LAN1 ▽ | LAN2 ▽ | LAN2 ▽ | LAN4 ▽ |

2401 — LAN port 1
2403 — LAN1 ▽

2405 — Confirmation button

2500  FIG. 8
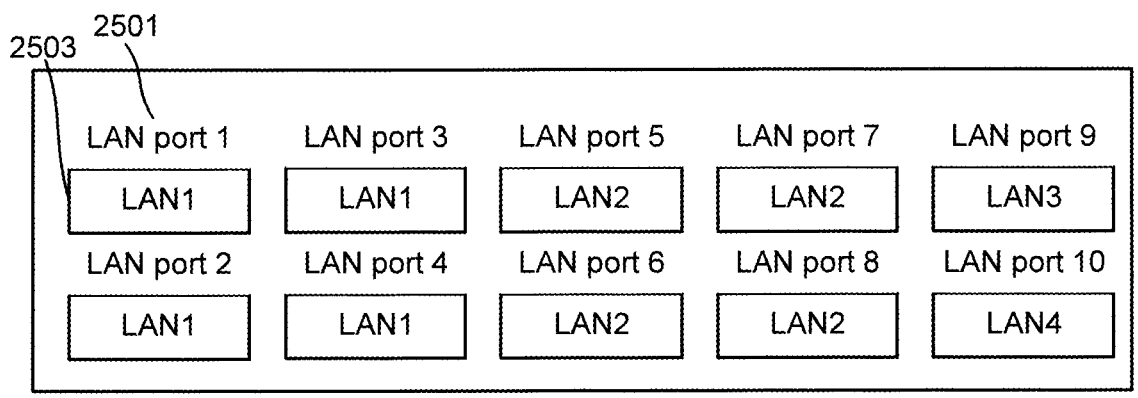
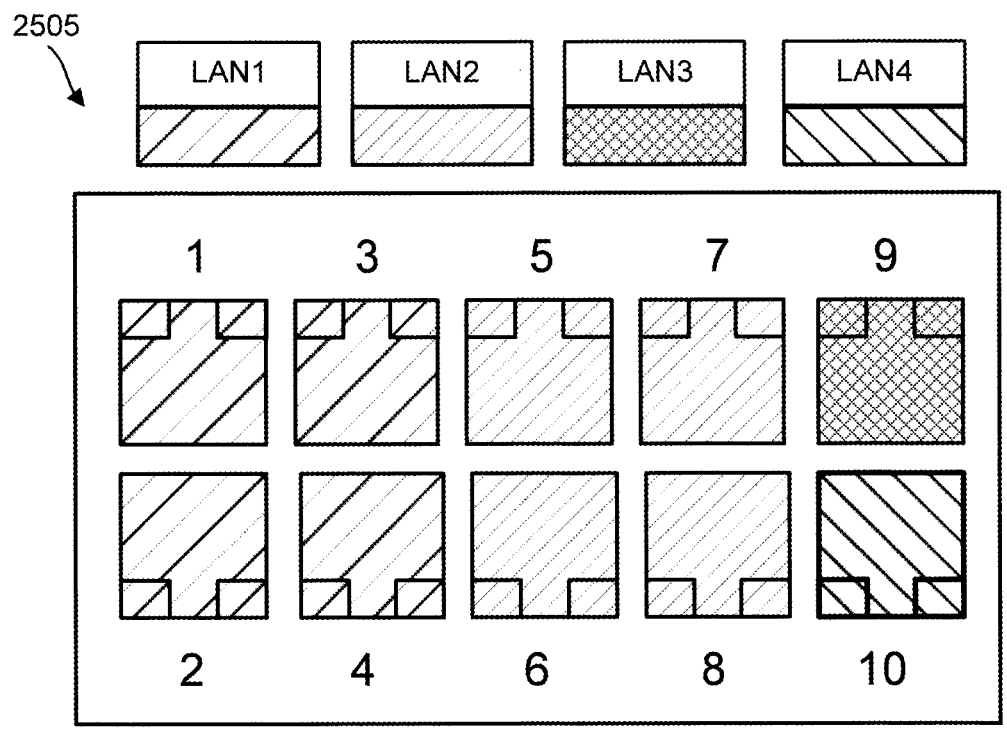

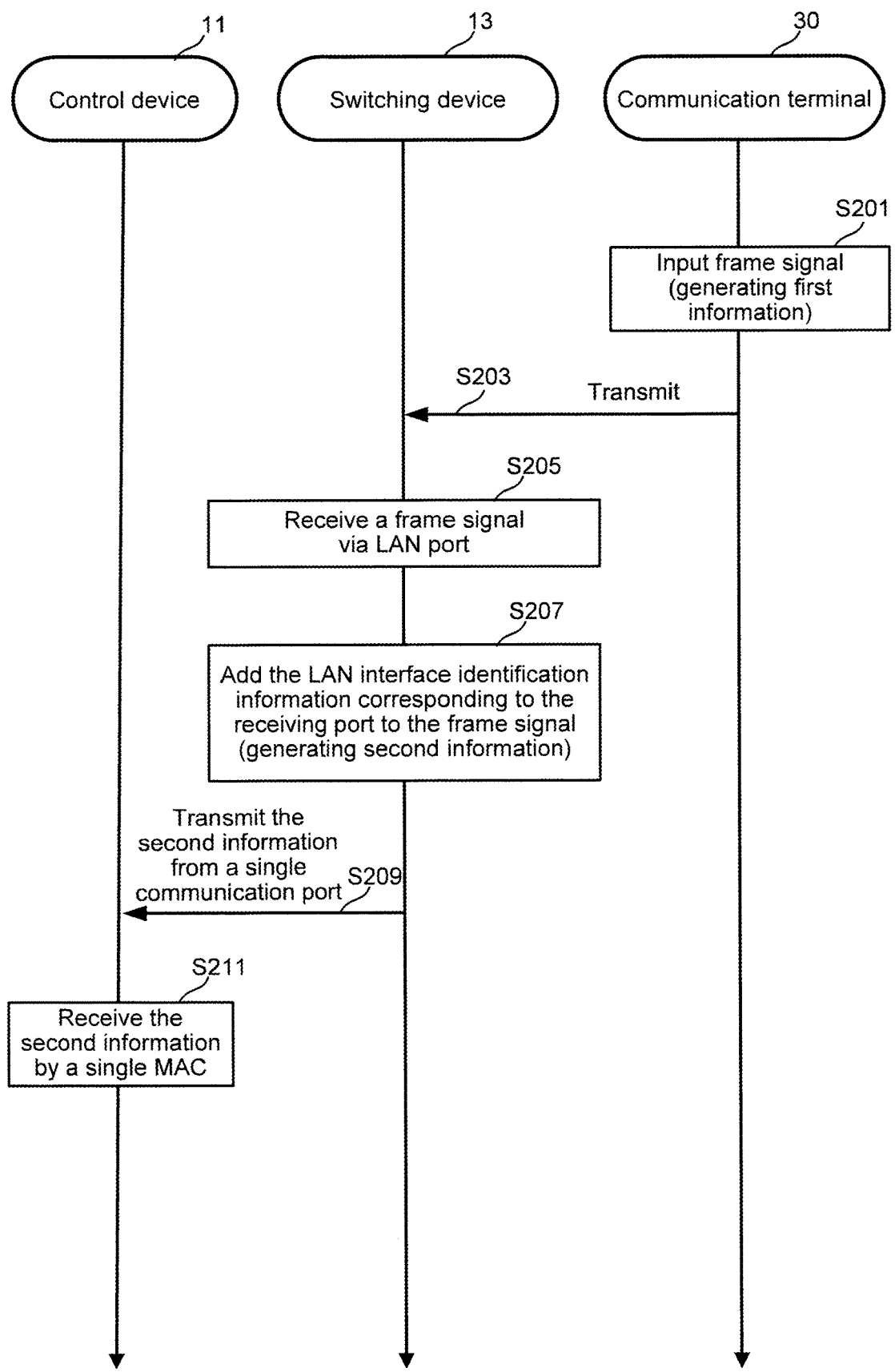

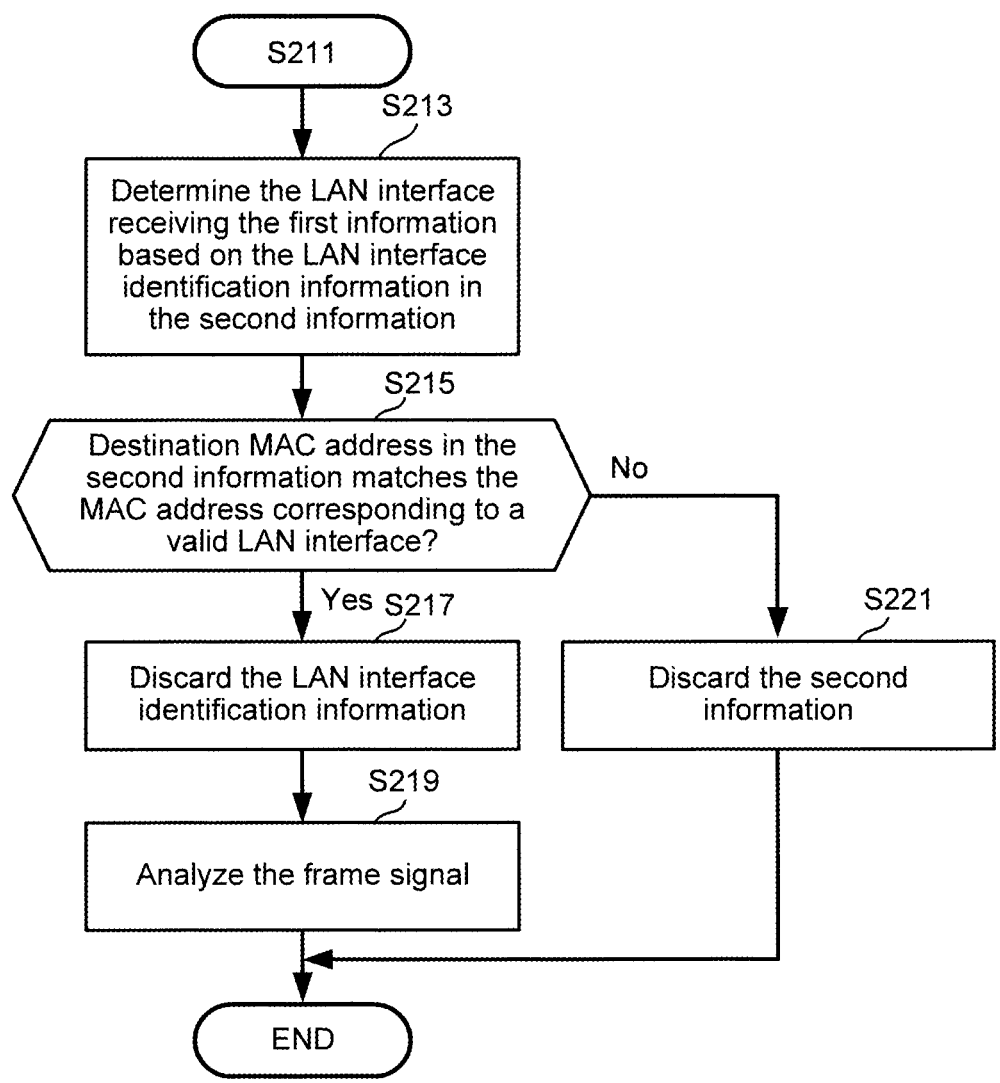

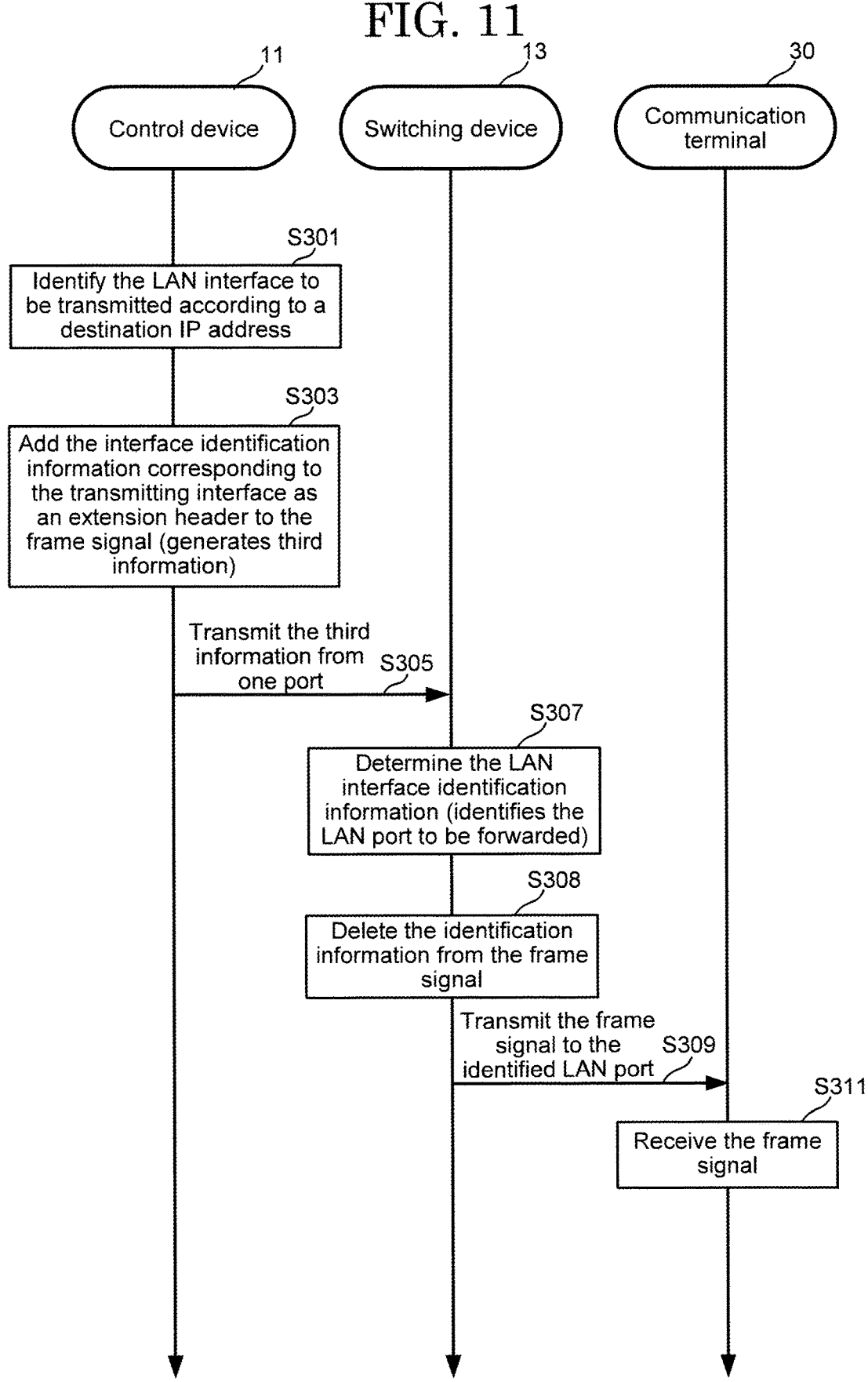

| LAN interface | LAN port |
|---|---|
| LAN1 | 2,3,4,5,6,7,8(1000BASE-T) 10(10GBASE-T) |
| LAN2 | 9(10GBASE-T) |
| LAN3 | 1(1000BASE-T) |

| LAN interface | LAN port information | MAC address |
|---|---|---|
| LAN1 | 2,3,4,5,6,7,8(1000BASE-T) 10(10GBASE-T) | 00:00:00:00:00:01 |
| LAN2 | 9(10GBASE-T) | 00:00:00:00:00:02 |
| LAN3 | 1(1000BASE-T) | 00:00:00:00:00:03 |

2701     2703     2705

COMMUNICATION RELAY DEVICE, COMMUNICATION CONTROL METHOD, AND NON-TRANSITORY COMPUTER READABLE STORAGE MEDIUM

CROSS-REFERENCE TO RELATED APPLICATIONS

This application claims the benefit of priority to Japanese Patent Application No. 2021-201965, filed on Dec. 13, 2021, the entire contents of which are incorporated herein by reference.

FIELD

The present disclosure relates to a communication relay device, a communication control method, and a non-transitory computer readable storage medium.

BACKGROUND

Conventionally, a router is used as a relay device that performs routing on a network. PCT International Publication No. WO 2008/114424 discloses a method of virtually dividing a network in accordance with a setting of a VLAN (Virtual Local Area Network) configured in association with each of a plurality of physical ports, and routing packets input and output from the plurality of physical ports.

SUMMARY

According to an embodiment of the present disclosure, there is provided a communication relay device including: a plurality of LAN ports configured to connect to at least one communication terminal; a first communication unit configured to receive first information transmitted from the at least one communication terminal via the plurality of LAN ports; a processor; and a memory configured to store a program, the program being executed by the processor to cause the processor to: set a LAN (Local Area Network) interface among a plurality of LAN interfaces for each of the plurality of LAN ports; set a MAC address from a plurality of MAC addresses for each of the plurality of LAN interfaces; and control communication so that each of the plurality of LAN interfaces functions as a virtual single switch associated with the MAC address.

BRIEF DESCRIPTION OF DRAWINGS

FIG. 3 is an example of a data table associating a LAN interface and a LAN port according to an embodiment of the present disclosure.

FIG. 4 is an example of a data table associating a LAN interface, a LAN port, and a MAC address according to an embodiment of the present disclosure.

FIG. 5 is an example of a data table associating a LAN port and interface identification information according to an embodiment of the present disclosure.

FIG. 7 is an example of a user interface according to an embodiment of the present disclosure.

FIG. 8 is an example of a user interface according to an embodiment of the present disclosure.

FIG. 9 is a flowchart showing an example of a flow of process executed by a communication system according to an embodiment of the present disclosure.

FIG. 10 is a flowchart showing an example of a flow of process executed by a communication system according to an embodiment of the present disclosure.

FIG. 11 is a flowchart showing an example of a flow of process executed by a communication system according to an embodiment of the present disclosure.

FIG. 15 is an example of a data table associating a LAN interface, port information, and a MAC address according to an embodiment of the present disclosure.

DESCRIPTION OF EMBODIMENTS

Figure 1:
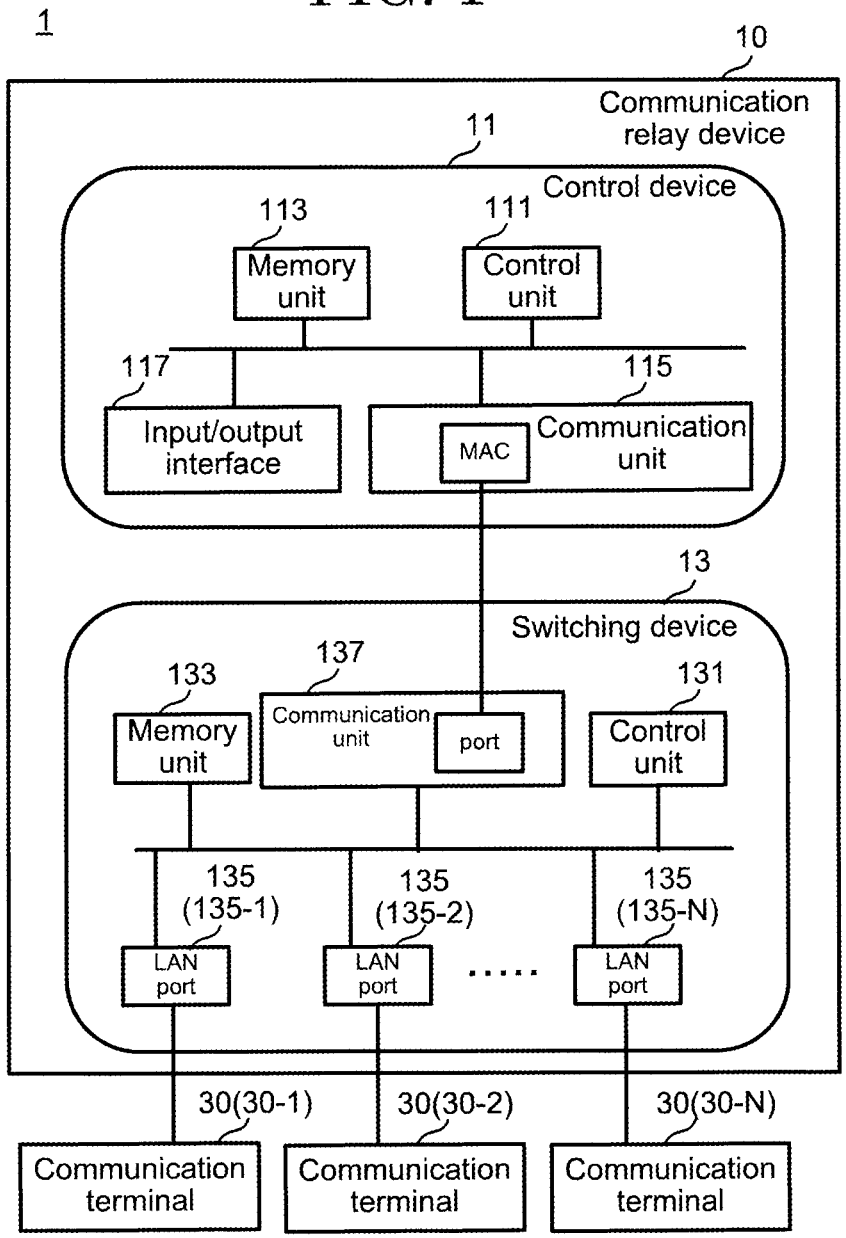
FIG. 1 is a schematic diagram showing an overall configuration of a communication system according to an embodiment of the present disclosure.

Hereinafter, embodiments of the present disclosure will be described with reference to the drawings and the like. However, the present disclosure can be implemented in many different aspects and should not be construed as being limited to the description of the embodiments exemplified below. Although the drawings may be schematically represented for clarity of explanation, they are merely examples, and do not limit the interpretation of the present disclosure. In addition, the terms "first" and "second" appended to each element are convenience signs used to distinguish each element, and do not have any further meaning unless otherwise specified. Also, in the drawings referred to in the present embodiment, the same or similar parts are denoted by the same symbols or similar symbols (symbols denoted only by A, B, 1, 2, and the like to a numeral XXX), and repeated description thereof may be omitted. In addition, a part of a configuration may be omitted from the drawings. Further, no particular explanation shall be given to elements if they are recognizable by a person ordinarily knowledgeable in the field to which the present disclosure pertains.

In a conventional VLAN setting, all the divided LAN interfaces have the same MAC address (Media Access Control address). Therefore, in the case where two divided interfaces are connected to ports of a switching hub divided into different network segments (for example, network segment A and network segment B) depending on the VLAN, terminals having the same MAC address are connected to all the ports because the LAN interfaces have the same MAC address in a conventional method. In the case where the MAC address of the interface is learned at the port of the network segment A in a MAC address learning function of the switching hub, there is a problem that a frame addressed to the network of the network segment B is also transferred to the port of the network segment A and normal communication cannot be performed. Therefore, an interface having a different MAC address is required to perform communication normally.

In view of such problems, the present disclosure provides an efficient communication relay method in the case where one router is used.

First Embodiment

A communication system according to the first embodiment of the present disclosure will be described in detail with reference to the drawings.

(1-1. Configuration of Communication System)

FIG. 1 is a block diagram showing a configuration of a communication system 1. As shown in FIG. 1, the communication system 1 includes a communication relay device 10 and a communication terminal 30. The communication relay device 10 includes a control device 11 and a switching device 13 and is configured as an integrated device.

(1-1-1. Control Device)

As shown in FIG. 1, the control device 11 includes a control unit 111, a memory unit 113, a communication unit 115, and an input/output interface 117. The control unit 111, the memory unit 113, the communication unit 115, and the input/output interface 117 are connected via a wiring bus.

The control unit 111 includes a memory including a CPU (Central Processing Unit), an ASIC (Application Specific Integrated Circuit), an FPGA (Field Programmable Gate Array), or other calculation processing circuits, and a ROM (Read Only Memory) and a RAM (Random Access Memory). The control unit 111 controls the function of each unit using a communication controlling program included in the memory.

A semiconductor memory such as an SSD (Solid State Drive), a magnetic recording medium (a magnetic tape, a magnetic disk, or the like), an optical recording medium, a magneto-optical recording medium, and a recordable element that is a storage medium are used as the memory unit 113. The memory unit 113 functions as a database for storing various information used in the communication control program.

The communication unit 115 (also referred to as a first communication unit) is an interface for transmitting and receiving information by being connected to the switching device 13 by wiring under the control of the control unit 111. In the present embodiment, a single MAC (Media Access Controller) is used for the communication unit 115.

The input/output interface 117 is connected to peripheral devices such as a display device, a keyboard, and a touch panel.

(1-1-2. Switching Device)

The switching device 13 includes a control unit 131, a memory unit 133, a LAN port 135, and a communication unit 137. The control unit 131, the memory unit 133, the LAN port 135, and the communication unit 137 are connected via a wiring bus. The switching device 13 is a device corresponding to an L2 (Layer 2) switch.

The control unit 131 controls each unit of the switching device 13 using a communication control program. The memory unit 133 has a function of a database for storing various information related to the communication control program. A device similar to that of the control device 11 can be used for the control unit 131 and the memory unit 133.

The LAN port 135 is an interface for transmitting and receiving information by being connected to the communication terminal 30 under the control of the control unit 131. The switching device includes a plurality of LAN ports 135 (in this case, LAN ports 135-1 to 135-N). Also, in the case where there is no need to distinguish between them in the present embodiment, they are described as the LAN port 135.

The communication unit 137 is an interface for transmitting and receiving information by being connected to the communication unit 115 of the control device 11 under the control of the control unit 131. The communication unit 137 includes a single communication port. That is, information is transmitted and received between a single MAC of the control device 11 and a single communication port of the switching device 13.

(1-1-3. Communication Terminal 30)

The communication terminal 30 is a computer device connected to the communication relay device 10. A plurality of communication terminals 30 is provided according to the LAN port 135 (in this example, the communication terminals 30-1, 30-2, . . . , 30-N are provided). For example, a personal computer is used as the communication terminal 30. Also, the communication terminal 30 is not limited to a personal computer and may be a mobile phone (feature phone), a smartphone, a tablet-type terminal, an IoT (Internet of Things) device (device having a power source mechanism, a communication function, and an information storage mechanism), an access point, or the like, and any device that is connected by wiring through the LAN port 135 and can communicate with each device can be applied. In the case where the communication terminal 30 is the access point, another communication terminal may be connected to the access point wirelessly. The communication terminal 30 may include a display unit and an operation unit in addition to the control unit, the memory unit, and the communication unit. A device similar to the control device 11 and the switching device 13 may be used for the control unit, the memory unit, and the communication unit. Common configurations such as a keyboard, a display, and a touch panel are used for the display unit and the operation unit.

(1-2. Functional Block Diagram of Communication System)

Figure 2:
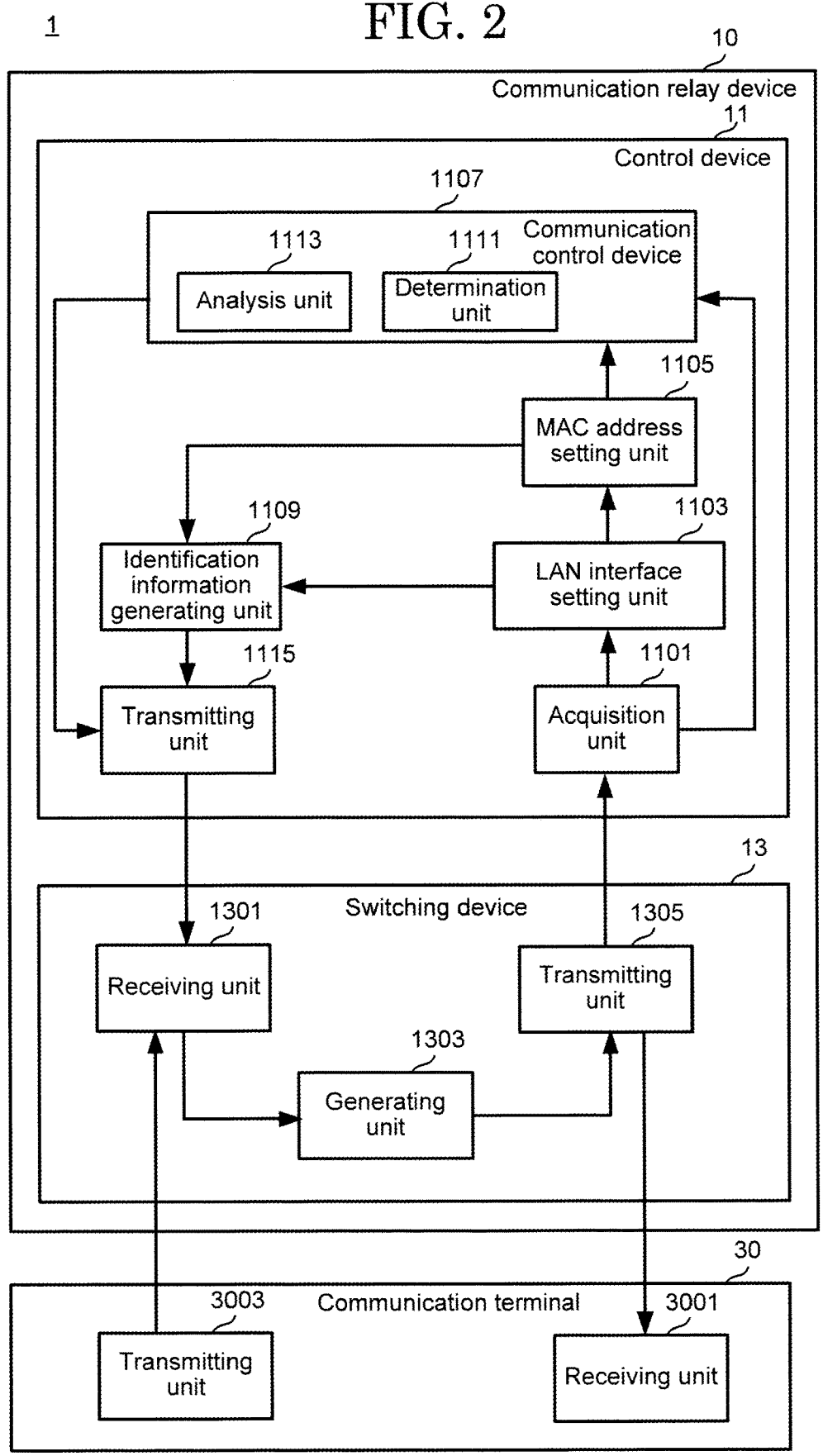
FIG. 2 is a functional block diagram of a communication system according to an embodiment of the present disclosure.

FIG. 2 is a block diagram showing an example of a functional configuration of the communication system 1. Each function described below is realized by hardware, software, or a combination of hardware and software.

In FIG. 2, the control device 11 includes an acquisition unit 1101, a LAN interface setting unit 1103, a MAC address setting unit 1105, a communication control unit 1107, an identification information generating unit 1109, and a transmitting unit 1115.

The acquisition unit 1101 has a function of acquiring various information from the switching device 13, a peripheral device such as a keyboard or a touch panel, and other external devices.

The LAN interface setting unit 1103 (also referred to as a first setting unit) has the function of setting one LAN interface among a plurality of LAN interfaces for each of the plurality of LAN ports. FIG. 3 is a data table 2100 used when setting the LAN interface. The data table 2100 includes LAN interface information 2101 and LAN port information 2103. The data table 2100 associates the LAN interface information 2101 and the LAN port information 2103. The LAN interface information 2101 is information of a configurable LAN interface. The LAN port information 2103 is information of any one among the plurality of LAN ports 135.

The MAC address setting unit 1105 (also referred to as a second setting unit) has a function of setting a single MAC address among a plurality of MAC addresses for each of the plurality of LAN interfaces. FIG. 4 is a data table 2200 used when setting the MAC address. The data table 2200 includes LAN interface information 2201, LAN port information 2203, and MAC address information 2205. The data table 2200 associates the LAN interface information 2201, the LAN port information 2203, and the MAC address information 2205. The LAN interface information 2201 is the same as the LAN interface information 2101. The LAN port information 2203 is the same as the LAN port information 2103. The MAC address information is a MAC address assigned to the LAN interface.

The communication control unit 1107 has the function of controlling communication so that each of the plurality of LAN interfaces functions as a virtual single switch associated with the configured MAC address.

The identification information generating unit 1109 has a function of generating identification information which corresponds to one of the MAC addresses and identifies the LAN interface. FIG. 5 is a data table 2300 used when generating LAN interface identification information. The data table 2300 includes LAN port information 2301 and the LAN interface identification information 2303. In the data table 2300, the LAN port information 2301 and the LAN interface identification information 2303 are associated. In the data table 2300, the LAN port information 2301 is the same as the LAN port information 2103. The LAN interface identification information 2303 is information for identifying a LAN interface associated with each LAN port.

In addition, the communication control unit 1107 includes a determination unit 1111 and an analysis unit 1113. The determination unit 1111 has a function of determining a frame signal acquired from the switching device 13. The analysis unit 1113 has a function of analyzing the content of the frame signal.

The transmitting unit 1115 has a function of transmitting various information in addition to the interface identification information to the switching device 13.

The switching device 13 includes a receiving unit 1301, a generating unit 1303, and a transmitting unit 1305.

The receiving unit 1301 has a function of receiving the frame signal and identification information transmitted from the communication terminal 30 and the control device 11.

The generating unit 1303 has a function of adding identification information corresponding to the LAN port receiving the frame signal to the frame signal (first information) received from the communication terminal 30 (also referred to as generating second information).

The transmitting unit 1305 has a function of transmitting the frame signal received by the plurality of LAN ports from the communication unit 137 (a single communication port) to the control device 11 based on the identification information. In addition, the transmitting unit 1305 has a function of transmitting the frame signal received by the plurality of LAN ports from the communication unit 137 to the communication terminal 30 based on the identification information.

The communication terminal 30 has a receiving unit 3001 and a transmitting unit 3003. The receiving unit 3001 receives the frame signal from the switching device 13. The transmitting unit 3003 transmits the frame signal to the switching device 13.

(1-3. Communication Control Process)

Next, communication control process based on a command by the communication control program will be described with reference to FIG. 6 to FIG. 12.

(1-3-1. Setting of LAN Interface and MAC Address)

Figure 6:
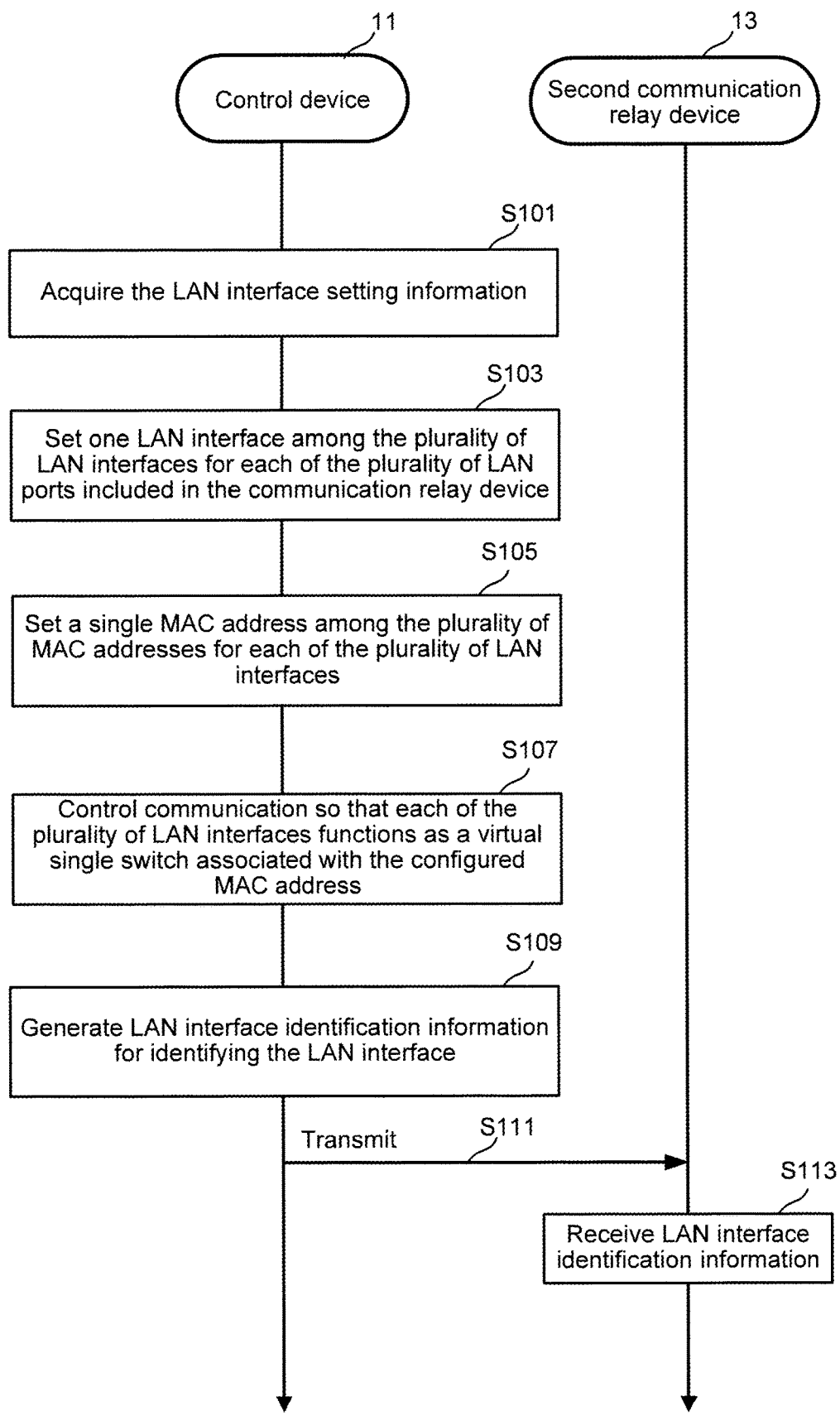
FIG. 6 is a flowchart showing an example of a flow of process executed by a communication relay device according to an embodiment of the present disclosure.

As shown in FIG. 6, first, the acquisition unit 1101 of the control device 11 acquires the LAN interface setting information (S101). In this example, for the acquisition unit 1101 to acquire the LAN interface setting information, the user sets the LAN interface using a peripheral device such as a keyboard or a display device connected to the input/output interface of the control device 11. FIG. 7 is an example of a graphical user interface displayed on the display device when setting the LAN interface. An input display screen 2400 of FIG. 7 includes LAN port information 2401, a LAN interface input unit 2403, and a confirmation button 2405. As shown in FIG. 7, in the present embodiment, information of the LAN interface to be set for each of ten LAN ports is input to the LAN interface input unit 2403. When the confirmation button 2405 is pressed after the input of the LAN interface information to be set for each of the LAN ports is completed, the acquisition unit 1101 acquires the LAN interface setting information.

The LAN interface setting unit 1103 sets one LAN interface among the plurality of LAN interfaces for each of the plurality of LAN ports based on the data table 2100 shown in FIG. 3 generated from the acquired LAN interface setting information (mapping the LAN interface and the LAN port) (S103). Specifically, the LAN ports 1, 2, 3, and 4 are set to a LAN1 interface. The LAN ports 5, 6, 7, and 8 are set to a LAN2 interface. The LAN port 9 is set to a LAN3 interface. The LAN port 10 is set to a LAN4 interface. FIG. 8 shows a display screen 2500 after the setting is completed. In FIG. 8, LAN port information 2501, LAN interface information 2503 set for each LAN port, and a LAN interface-LAN port map 2505 indicating which LAN interface each LAN port is set is displayed on the display screen 2500.

Next, the MAC address setting unit 1105 sets a single MAC address among the plurality of MAC addresses for each of the plurality of LAN interfaces (S105). In this example, a MAC address "00:00:00:00:00:01" (also referred to as a first MAC address) is set to the LAN1 interface. A MAC address "00:00:00:00:00:02" (also referred to as a second MAC address) is set to the LAN2 interface. A MAC address "00:00:00:00:00:03" (also referred to as a third MAC address) is set to the LAN3 interface. A MAC address "00:00:00:00:00:04" is set to the LAN4 interface. As a result, as shown in FIG. 4, the data table 2200 indicating the relationship between the LAN port, the LAN interface, and the MAC address is generated. The communication control unit 1107 controls the communication so that each of the plurality of LAN interfaces functions as a virtual single switch associated with the configured MAC address based on the information of the data table 2200 (S107).

In this case, the identification information generating unit 1109 generates identification information, which corresponds to the MAC address and identifies the LAN interface as shown in FIG. 5 (S109). In this example, the LAN interface identification information ID1 is generated for the LAN ports 1, 2, 3, and 4. LAN interface identification information ID2 is generated for the LAN ports 5, 6, 7, and 8. LAN interface identification information ID3 is generated for the LAN port 9. LAN interface identification information ID4 is generated for the LAN port 10. The transmitting unit 1115 transmits the generated LAN interface identification information to the switching device 13 (S111). The switching device 13 receives the LAN interface identification information (S113).

(1-3-2. Communication Control Process when Receiving Frame Signal)

Next, a communication control process when receiving the frame signal in each LAN interface will be described. As shown in FIG. 9, first, a transmission command of a frame signal is input to the communication terminal 30 by operating the communication terminal 30 by the user (S201). The transmitting unit 3003 of the communication terminal 30 transmits the frame signal (the first information) to the switching device 13 (S203).

The frame signal is received by the receiving unit 1301 of the switching device 13 via the LAN port 135 (S205). When the frame signal is received, the generating unit 1303 adds the LAN interface identification information corresponding to the LAN port receiving the frame signal to the frame signal as an extension header (generates the second information) (S207). The transmitting unit 1305 transmits the first information from the communication unit 137 (a single communication port) to the control device 11 (S209).

The acquisition unit 1101 of the control device 11 receives the first information by the communication unit 115 (a single MAC) (S211). As shown in FIG. 10, the determination unit 1111 determines the LAN interface receiving the frame signal (the first information) based on the LAN interface identification information in the acquired second information (the frame signal) (S213). In this case, it is determined whether a destination MAC address (the first MAC address) in the second information (frame signal) matches the MAC address corresponding to a valid LAN interface (S215).

In the case where "ID1" is added as the LAN interface identification information and the destination MAC address in the frame signal is "00:00:00:00:00:03" corresponding to the LAN3 interface, the communication control unit 1107 (the determination unit 1111) determines that the destination MAC address (the first MAC address) in the frame signal does not match the MAC address corresponding to the valid LAN interface (S215; No). In this case, the communication control unit 1107 (the determination unit 1111) discards the frame signal (the second information) (S221).

In the case where "ID1" is added to the frame signal as the LAN interface identification information and the destination MAC address in the frame signal is "00:00:00:00:00:01" corresponding to the LAN1 interface, the communication control unit 1107 (the determination unit 1111) determines that the destination MAC address (the first MAC address) in the frame signal matches the MAC address corresponding to the valid LAN interface (S215; Yes). In this case, the communication control unit 1107 (the determination unit 1111) discards the LAN interface identification information from the frame signal (S217). The analysis unit 1113 analyzes the content of the frame signal (S219). In this case, when the content of the frame signal is a Ping packet addressed to its own LAN interface, the communication control unit 1107 generates a response packet. Alternatively, in the case which the frame signal is a packet to be forwarded to a different LAN interface (transmitted from the LAN interface corresponding to the first MAC address to the LAN interface corresponding to the second MAC address), the communication control unit 1107 rewrites an ether header so that it can be transmitted to the LAN port of the different LAN interface.

(1-3-3. Transmission of Frame Signal)

Next, a communication control process in the case where the frame signal is transmitted to a different LAN interface will be described. The communication control unit 1107 identifies the LAN interface to be transmitted to according to a destination IP address (S301). The communication control unit 1107 sets the MAC address assigned to the destination LAN interface as the source MAC address of the ether header. Further, the communication control unit 1107 adds the interface identification information corresponding to the transmitting interface as an extension header to the frame signal (generates third information) (S303). The transmitting unit 1115 transmits the frame signal (the third information) to the switching device 13 via a single MAC (S305). Upon receiving the frame signal, the switching device 13 identifies the LAN port to be forwarded based on the LAN interface identification signal included in the extension header of the received frame signal (S307). The switching device 13 deletes the identification signal from the frame signal (S308) and transmits the frame signal to the identified LAN port (S309). The communication terminal 30 receives the frame with the extension header removed (S309). The above description is the communication control process.

Here, a conventional technique is compared with the communication system of the present embodiment. In the case where the LAN interface is divided using the conventional technique, since each LAN interface has the same MAC address, terminals having the same MAC address are connected to all the ports. In the case where the MAC address of the interface is learned at the port of the network segment A in the MAC address learning function of the switching hub, there is a problem that the frame addressed to the network of the network segment B is also transferred to the port of the network segment A and normal communication cannot be performed. Therefore, an interface having a different MAC address is required to perform communication normally. On the other hand, in the present embodiment, each LAN interface has a unique MAC address. This makes it possible to assign different IP addresses to each LAN interface.

Therefore, it is possible to configure a network according to the usage environment of the user and it is possible to efficiently use a router resource without using a plurality of routers by using the present embodiment.

Second Embodiment

In the present embodiment, a communication system different from the first embodiment will be described in detail with reference to the drawings. Specifically, a communication relay device having ports with different link speeds will be described. Also, configurations similar to those of the first embodiment will be omitted as appropriate for the sake of explanation.

(2-1. Configuration of Communication System)

Figure 12:
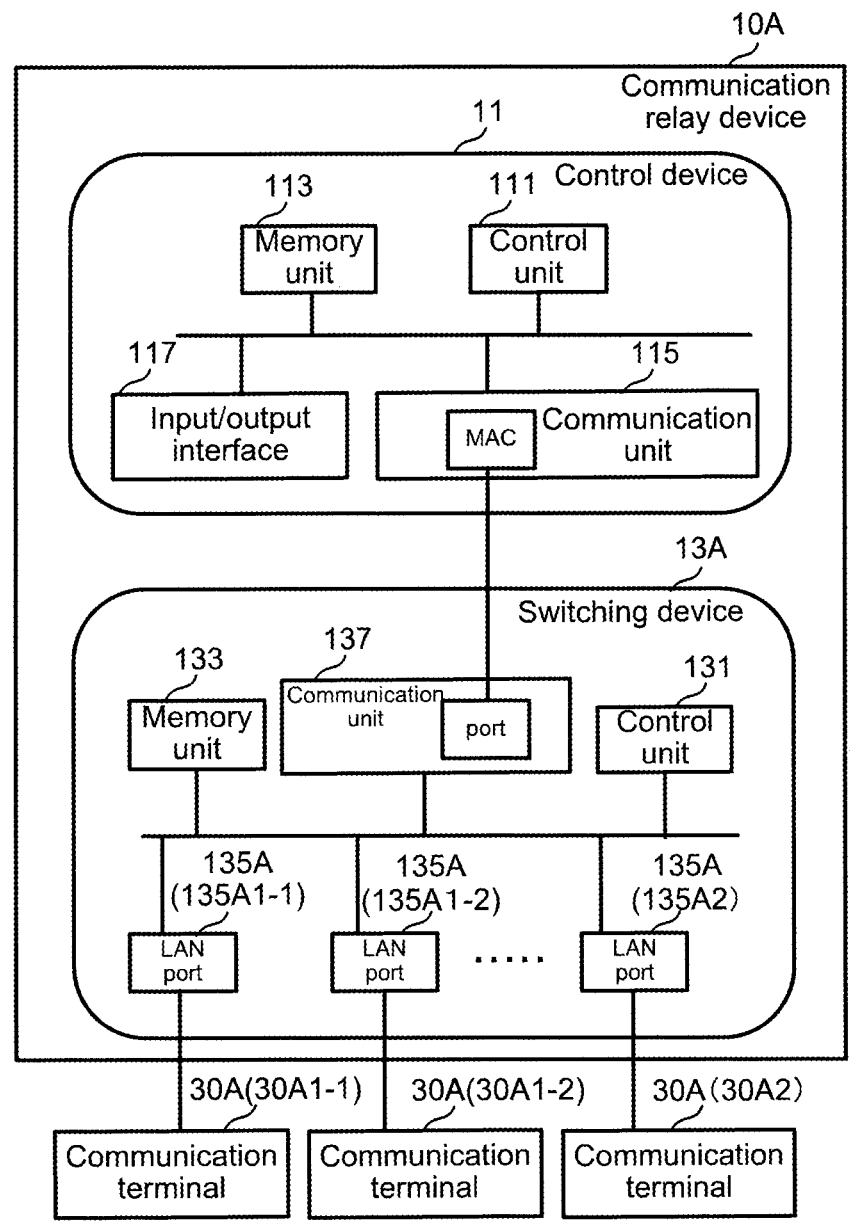
FIG. 12 is a schematic diagram showing an overall configuration of a communication system according to an embodiment of the present disclosure.

FIG. 12 is a block diagram showing a configuration of a communication system 1A. As shown in FIG. 12, the communication system 1A includes a communication relay device 10A and a communication terminal 30A. The communication relay device 10A includes the control device 11 and a switching device 13A.

Figures 13, 14:
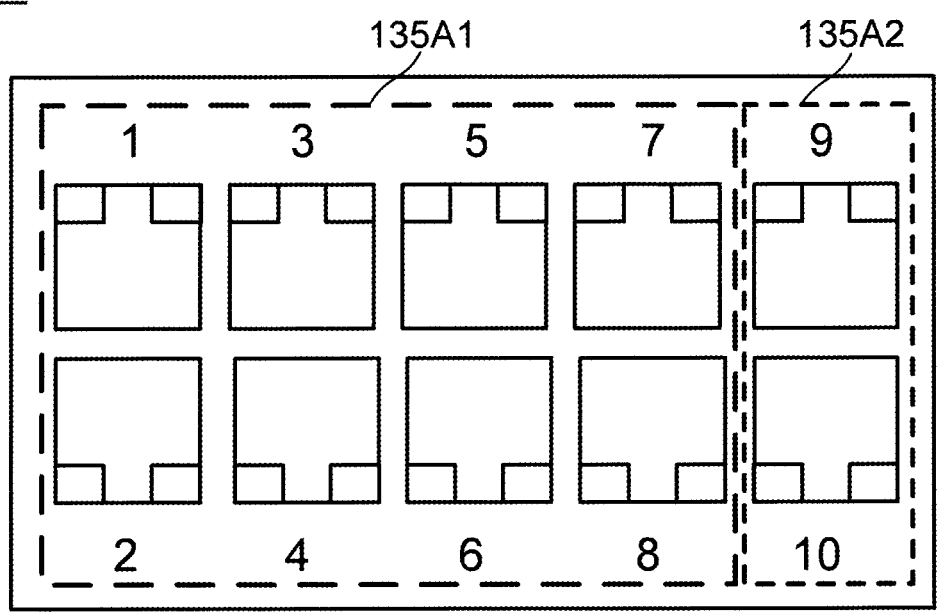
FIG. 13 is a flowchart showing an example of a flow of process executed by a communication system according to an embodiment of the present disclosure.
FIG. 14 is an example of a data table associating a LAN interface and port information according to an embodiment of the present disclosure.

The switching device 13A includes the control unit 131, the memory unit 133, a LAN port 135A, and the communication unit 137. The LAN port 135A is an interface for transmitting and receiving information under the control of the control unit 131 by being connected to the communication terminal 30. FIG. 13 is a schematic diagram of the LAN port 135A. As shown in FIG. 13, the switching device 13A includes a plurality of LAN ports 135A to which a LAN cable is connected. In this example, the LAN port 135A includes a LAN port 135A1 (also referred to as a first LAN port or a low-speed communication LAN port) and a LAN port 135A2 (also referred to as a second LAN port or a high-speed communication LAN port) with different link speeds. Specifically, in the LAN port 135A, the LAN port 135A1 corresponding to the LAN ports 1 to 8 corresponds to a link speed of up to 1 Gbps. The LAN port 135A1 is also referred to as a 1000BASE-T port. The LAN port 135A2 corresponding to the LAN ports 9 to 10 corresponds to a link speed of up to 10 Gbps. The LAN port 135A2 is also referred to as a 10GBASE-T port.

The communication terminal 30A is a computer device connected to the communication relay device 10. In the present embodiment, the communication terminal 30A includes a communication terminal 30A1 and a communication terminal 30A2 having communication ports (interfaces) with different link speeds (data transfer rate). The communication terminal 30A1 has an interface with a data transfer rate of up to 1 Gbps. The communication terminal 30A2 has an interface with a data transfer rate of up to 10 Gbps.

In the present embodiment, the LAN interface setting unit 1103 sets one LAN interface among the plurality of LAN interfaces for each of the plurality of LAN ports (performs mapping of the LAN interface and the LAN port).

FIG. 14 is a data table 2600 used when setting the LAN interface. The data table 2600 includes LAN interface information 2601 and LAN port information 2603. As shown in FIG. 14, mapping information that associates the LAN port with the LAN interface is generated. Specifically, the LAN ports 137A1-2 to 8 with a low link speed and the LAN port 137A2-10 with a high link speed are set to the LAN1 interface. The LAN port 137A2-9 with a high link speed is set to the LAN2 interface. The LAN port 137A1-1 with a low link speed is set to the LAN3 interface. That is, the LAN interface setting unit 1103 may associate the high-speed communication LAN port with the same LAN interface as the low-speed communication LAN port, or the LAN interface setting unit 1103 may associate the high-speed communication LAN port with a LAN interface that is different from the low-speed communication LAN port.

Furthermore, the MAC address setting unit 1105 sets a single MAC address among the plurality of MAC addresses for each of the plurality of LAN interfaces. FIG. 15 is a data table 2700 used when setting the MAC address. The data table 2700 includes LAN interface information 2701, LAN port information 2703, and MAC address information 2705. In this example, the MAC address "00:00:00:00:00:01" is set to the LAN1 interface. The MAC address "00:00:00:00:00:02" is set to the LAN2 interface. The MAC address "00:00:00:00:00:03" is set to the LAN3 interface. In the data table 2700, the LAN interface information 2701, the LAN port information 2703, and the MAC address information 2705 are associated. The communication control unit 1107 controls the communication so that each of the plurality of LAN interfaces functions as a virtual single switch associated with the configured MAC address based on the data table 2700.

Here, a conventional technique is compared with the communication system of the present embodiment. In the case where the LAN interface is divided using the conventional technique, it is possible to divide only the LAN interface having the switching hub with the same link speed. In addition, in the case where the communication terminal with a high link speed interface and the communication terminal with a low link speed interface are connected to a router with the high link speed interface and a low link speed switching hub, there is a need to (1) reduce the high link speed and adjust it to the low link speed to connect to the router's switching hub, or (2) provide a separate switching hub that supports the high link speed to increase the router's high link speed interface. On the other hand, in the present embodiment, the control device 11 can control the network communication as the same interface even if a plurality of LAN ports with different link speeds is included. As a result, there is no need to reduce the link speed of the communication terminal with the high-link-speed interface, and there is no need to prepare a new communication relay device.

Therefore, it is possible to configure a network according to the usage environment for each user without being limited to the link speed and efficiently use the router resource without using a plurality of routers by using the present embodiment.

(Modifications)

Within the spirit of the present disclosure, it is understood that various modifications can be made by those skilled in the art and that these modifications also fall within the scope of the present disclosure. For example, the addition, deletion, or design change of components, or the addition, deletion, or condition change of processes as appropriate by those skilled in the art based on each present embodiment are also included in the scope of the present disclosure as long as they are provided with the gist of the present disclosure.

In the first embodiment of the present disclosure, although an example in which the LAN interface is set from the peripheral device such as a keyboard or a display device connected to the input/output interface is shown, the present disclosure is not limited thereto. For example, the setting information may be input by the communication terminal 30. In this case, the setting information may be transmitted to the control device 11 via the switching device 13.

In addition, in the first embodiment of the present disclosure, although an example in which the frame signal is analyzed by the control device is shown, the present disclosure is not limited thereto. For example, in the case where the identification information is transmitted to the same ports, the frame signal may be transmitted without the control device. As a result, the process (load) by the control device 11 is reduced.

In the first embodiment of the present disclosure, although an example in which the LAN interface and the LAN port are mapped using the graphical user interface is shown, the present disclosure is not limited thereto. For example, the LAN interface and the LAN port may be mapped using a CLI (Command Line Interface) using only a keyboard. In this case, for example, the LAN interface and the LAN port may be mapped based on character information indicating "lan1=1-4 lan2=5-8 lan3=9 lan4=10".

In addition, in the first embodiment of the present disclosure, although an example in which the communication relay device 10 includes the control device 11 and the switching device 13 and is set to an integrated device is shown, the present disclosure is not limited thereto. The control device 11 and the switching device 13 may be provided independently.

In addition, in the first embodiment of the present disclosure, although an example in which each of the control device 11 and the switching device 13 has the memory unit is shown, the present disclosure is not limited thereto. The communication relay device 10 may include one memory unit as a database, and the control device 11 and the switching device 13 may store information in the memory unit.

In the communication relay device according to an embodiment of the present disclosure, the first communication unit may be a single MAC (Media Access Controller).

The communication relay device according to an embodiment of the present disclosure may include a switching device including the plurality of LAN ports and a second communication unit transmitting the first information received by the plurality of LAN ports to the first communication unit. The second communication unit may have a single communication port.

In the communication relay device according to an embodiment of the present disclosure, the plurality of LAN ports may include the first LAN port and a second LAN port corresponding to a higher link speed than a link speed of the first LAN port, and the first setting unit may associate the second LAN port and the first LAN port with the same LAN interface.

In the communication relay device according to an embodiment of the present disclosure, the plurality of LAN ports may include the first LAN port and the second LAN port corresponding to a higher link speed than the link speed of the first LAN port, the first setting unit may associate the first LAN port with a first LAN interface, and the first setting unit may associate the second LAN port with a second LAN interface different from the first LAN interface.

In the communication relay device according to an embodiment of the present disclosure, the program may cause the processor to add identification information corresponding to a LAN port receiving the first information to the first information.

In the communication relay device according to an embodiment of the present disclosure, the program may cause the processor to determine the LAN interface receiving the first information based on the identification information.

In the communication relay device according to an embodiment of the present disclosure, the program may cause the processor to discard the first information when the destination MAC address of the first information does not match a MAC address of a valid LAN interface.

In the communication relay device according to an embodiment of the present disclosure, the plurality of MAC addresses may include the first MAC address and the second MAC address, and the program may cause the processor to transmit the first information to a LAN interface corresponding to the second MAC address when the first information received from a LAN interface corresponding to the first MAC address satisfies a predetermined condition.

In addition, according to an embodiment of the present disclosure, a communication control method includes setting a LAN interface among a plurality of LAN interfaces for each of a plurality of LAN ports, the plurality of LAN ports being included in a communication relay device, setting a MAC address among a plurality of MAC addresses for each of the plurality of LAN interfaces, and controlling communication so that each of the plurality of LAN interfaces functions as a virtual single switch associated with the MAC address.

The communication control method may include transmitting the first information received by the plurality of LAN ports to the control device by the switching device.

According to the communication control method, the control device may receive the first information by a single MAC (Media Access Controller).

In the communication control method, the plurality of LAN ports may include the first LAN port and the second LAN port corresponding to a higher link speed than the link speed of the first LAN port, and the control device may associate the first LAN port and the second LAN port with the same LAN interface.

In the communication control method, the plurality of LAN ports may include the first LAN port and the second LAN port corresponding to a higher link speed than the link speed of the first LAN port, and the control device may associate the first LAN port with the first LAN interface and the second LAN port with the second LAN interface different from the first LAN interface.

The communication control method may include receiving identification information identifying the LAN interface from the control device and adding the identification information to the first information and transmitting it to the control device.

The communication control method may include determining the LAN interface receiving the first information based on the identification information.

The communication control method may include discarding the first information when the first information satisfies a predetermined condition.

In the communication control method, the plurality of MAC addresses includes the first MAC address and the second MAC address, and the first information may be transmitted to the LAN interface corresponding to the second MAC address when the first information received from the LAN interface corresponding to the first MAC address satisfies a predetermined condition.

In addition, according to an embodiment of the present disclosure, there is provided a non-transitory computer readable storage medium storing a program for causing a computer to: set a LAN (Local Area Network) interface among a plurality of LAN interfaces for each of a plurality of LAN ports included in a switching device; set a MAC address from a plurality of MAC addresses for each of the plurality of LAN interfaces; and control communication so that each of the plurality of LAN interfaces functions as a virtual single switch associated with the MAC address.

What is claimed is:

1. A communication relay device comprising:
    a plurality of local area network (LAN) ports, each of the plurality of LAN ports being configured to connect to a communication terminal;
    a control device including a first communication unit comprising an interface connected to the plurality of LAN ports by wiring and being configured to receive first information transmitted from the communication terminal via a first LAN port among the plurality of LAN ports to which the communication terminal is connected;
    a processor; and
    a memory configured to store a program, the program being executable by the processor to cause the processor to:
    set a LAN interface among a plurality of LAN interfaces for each of the plurality of LAN ports;
    respectively set a media access controller (MAC) address among a plurality of MAC addresses for each LAN interface of the plurality of LAN interfaces; and
    control communication so that each LAN interface of the plurality of LAN interfaces functions as a virtual single switch associated with the MAC address respectively set for each LAN interface of the plurality of LAN interfaces.

2. The communication relay device according to claim 1, wherein
    the first communication unit is a single MAC.

3. The communication relay device according to claim 1, further comprising:
    a switching device including the plurality of LAN ports and a second communication unit configured to transmit the first information received at the first LAN port to the first communication unit, wherein the second communication unit has a single communication port for transmitting the first information to the first communication unit.

4. The communication relay device according to claim 1, wherein
the plurality of LAN ports includes the first LAN port having a first link speed and a second LAN port having a second link speed higher than the first link speed of the first LAN port, and
the same LAN interface is set for the first LAN port and the second LAN port.

5. The communication relay device according to claim 1, wherein
the plurality of LAN ports includes the first LAN port having a first link speed and a second LAN port having a second link speed higher than the first link speed of the first LAN port,
a first LAN interface is set for the first LAN port, and
a second LAN interface different from the first LAN interface is set for the second LAN port.

6. The communication relay device according to claim 1, wherein
the program, when executed, further causes the processor to add identification information, corresponding to the first LAN port, to the first information.

7. The communication relay device according to claim 6, wherein
the program, when executed, further causes the processor to determine, based on the identification information, a LAN interface that received the first information.

8. The communication relay device according to claim 7, wherein
the program, when executed, further causes the processor to discard the first information in a case where a destination MAC address of the first information does not match a MAC address of a valid LAN interface.

9. The communication relay device according to claim 7, wherein
the plurality of MAC addresses includes a first MAC address and a second MAC address, and
the program, when executed, further causes the processor to transmit the first information to a LAN interface corresponding to the second MAC address in a case where the first information received from a LAN interface corresponding to the first MAC address satisfies a predetermined condition.

10. The communication relay device according to claim 1, further comprising:
a switching device including the plurality of LAN ports and a second communication unit configured to transmit the first information received at the first LAN port to the first communication unit,
wherein the second communication unit has a single communication port for transmitting the first information to the first communication unit, and
wherein the first communication unit is a single media access controller.

11. A communication control method for a communication relay device comprising (i) a plurality of local area network (LAN) ports included in a switching device, each of the plurality of LAN ports being configured to connect to a communication terminal and (ii) a control device including a first communication unit comprising an interface connected to the plurality of LAN ports by wiring and being configured to receive first information transmitted from the communication terminal via a first LAN port among the plurality of LAN ports to which the communication terminal is connected, the communication control method comprising:
setting a LAN interface among a plurality of LAN interfaces for each of the plurality of LAN ports included in the switching device;
respectively setting a media access controller (MAC) address from a plurality of MAC addresses for each LAN interface of the plurality of LAN interfaces; and
controlling communication so that each LAN interface of the plurality of LAN interfaces functions as a virtual single switch associated with the MAC address respectively set for each LAN interface of the plurality of LAN interfaces.

12. The communication control method according to claim 11, further comprising:
transmitting, by the switching device, first information received by a first LAN port among the plurality of LAN ports to the control device.

13. The communication control method according to claim 12, further comprising:
receiving, at the control device, the first information by a single MAC.

14. The communication control method according to claim 12, wherein
the plurality of LAN ports includes the first LAN port having a first link speed and a second LAN port having a second link speed higher than the first link speed of the first LAN port, and
the first LAN port and the second LAN port are associated with the same LAN interface.

15. The communication control method according to claim 12, wherein
the plurality of LAN ports includes the first LAN port having a first link speed and a second LAN port having a second link speed higher than the first link speed of the first LAN port,
the first LAN port is associated with a first LAN interface, and
the second LAN port is associated with a second LAN interface different from the first LAN interface.

16. The communication control method according to claim 12, further comprising:
receiving, by the switching device, identification information identifying the LAN interface from the control device, and
adding the identification information to the first information and transmitting the first information having the identification information to the control device.

17. The communication control method according to claim 16, further comprising:
determining, based on the identification information, a LAN interface that received the first information.

18. The communication control method according to claim 17, further comprising:
discarding the first information in a case where the first information satisfies a predetermined condition.

19. The communication control method according to claim 17, wherein
the plurality of MAC addresses includes a first MAC address and a second MAC address, and
the first information is transmitted to a LAN interface corresponding to the second MAC address in a case where the first information received from a LAN interface corresponding to the first MAC address satisfies a predetermined condition.

20. A non-transitory computer readable storage medium storing a program, that when executed, causes a computer to execute a communication control method for a communication relay device comprising (i) a plurality of local area network (LAN) ports included in a switching device, each of the plurality of LAN ports being configured to connect to a communication terminal and (ii) a control device including a first communication unit comprising an interface connected to the plurality of LAN ports by wiring and being configured to receive first information transmitted from the communication terminal via a first LAN port among the plurality of LAN ports to which the communication terminal is connected, the communication control method comprising:

setting a LAN interface among a plurality of LAN interfaces for each of the plurality of LAN ports included in the switching device;

respectively setting a media access controller (MAC) address from a plurality of MAC addresses for each of the plurality of LAN interfaces; and controlling communication so that each LAN interface of the plurality of LAN interfaces functions as a virtual single switch associated with the MAC address respectively set for each LAN interface of the plurality of LAN interfaces.

\* \* \* \* \*